June 13, 1967
W. J. ELLEBOUDT
3,325,128
TUBING RETAINER CLIP
Filed July 15, 1965
2 Sheets-Sheet 1
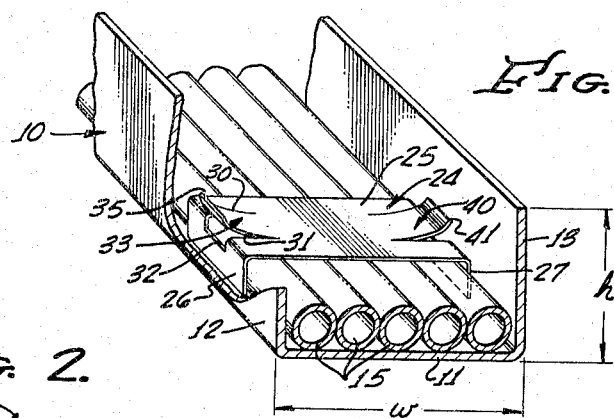
Fig. 1.
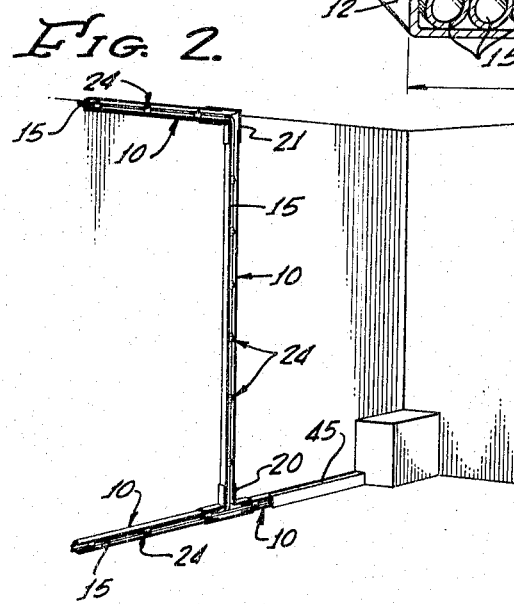
Fig. 2.
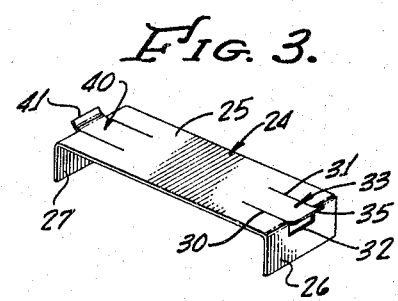
Fig. 3.
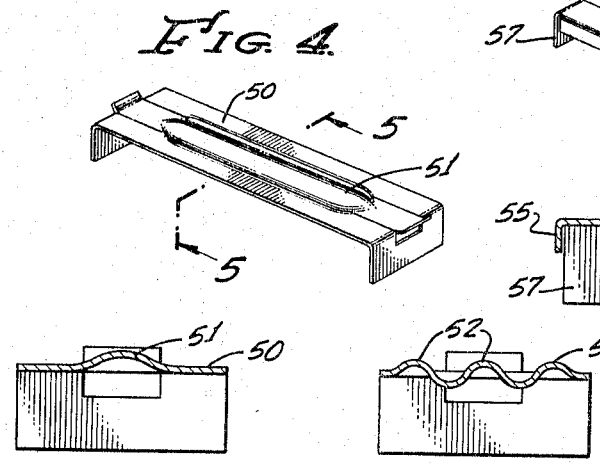
Fig. 4.
Fig. 7.
Fig. 8.
Fig. 5.
Fig. 6.
INVENTOR.
WALTER J. ELLEBOUDT
BY FOWLER, KNOBBE
& GAMBRELL
ATTORNEYS.

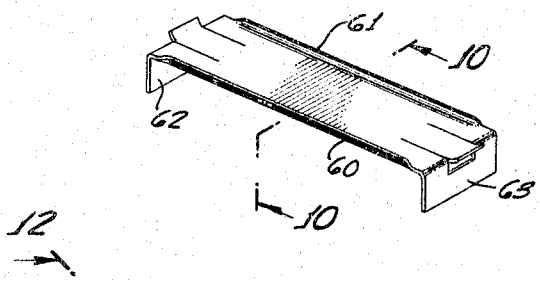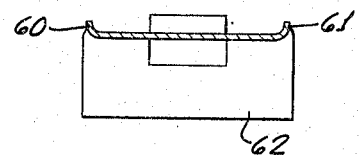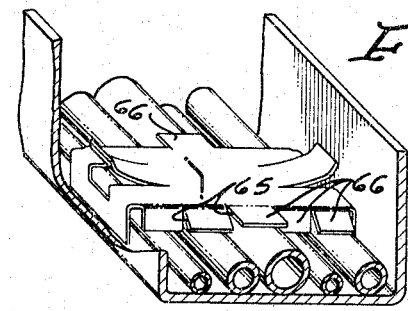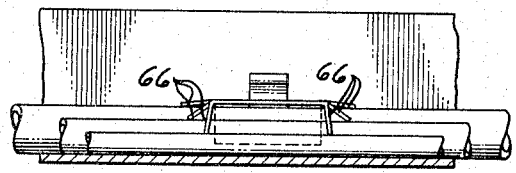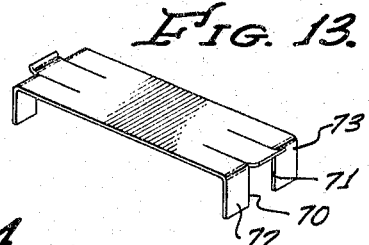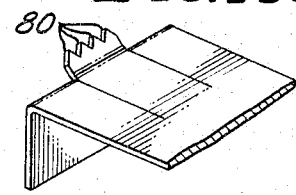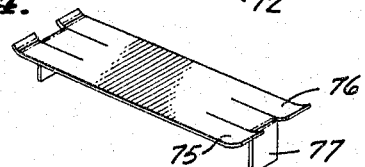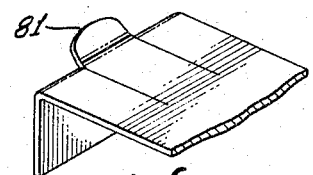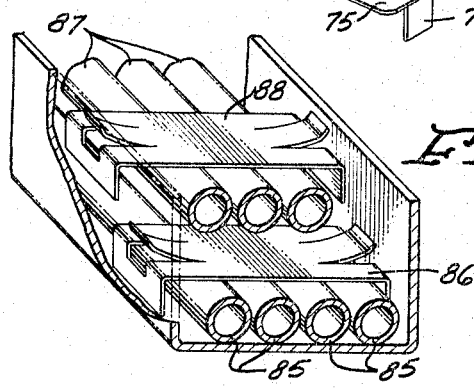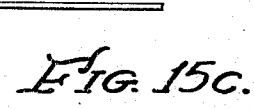

United States Patent Office 3,325,128
Patented June 13, 1967

3,325,128
TUBING RETAINER CLIP
Walter J. Elleboudt, 1909 Monte Vista Drive,
Whittier, Calif. 90601
Filed July 15, 1965, Ser. No. 472,172
20 Claims. (Cl. 248—68)

My invention relates to an improved clip for retaining tubing, hose, wires or similar devices in a channeled member.

In industrial plants such as refineries, petrochemical and power plants, instrument tubing is extensively used in instrumentation and control systems for sending air control signals to diaphragm valves and for transmitting signals from sensor devices to indicating, recording or controlling instruments. Similarly, such tubing is used in nuclear plants, air conditioning installations, and missile and rocket test stands. One or a plurality of parallel runs of instrument tubing are usually supported and protected by a structural member defining an elongated channel.

Heretofore such tubing has been retained in place in the channel by means of a bar or similar device having one or more holes drilled in it. The bar is then placed at right angles over the tubing in the channel in juxtaposition to a hole or holes drilled in the channel and a bolt or bolts inserted through the holes in the bar and channel and secured by a nut. This procedure is quite time consuming and adds to the over-all cost of the instrumentation system.

Accordingly, it is an object of my invention to provide a retainer clip which does not require any holes to be drilled in the channel nor nuts and bolts to be assembled.

Another feature of my invention is that a given retainer clip may be used in conjunction with channeled members of varying depth.

It is still another feature of my invention that a given retainer clip may be used in a given channel regardless of the diameter of the retained tubular devices.

A further object of my invention is to provide a retainer clip which may be used to hold one or several layers of tubing or like devices in a given channel.

Still another object of my invention is to provide a retainer clip for holding tubing or like devices having different outside diameters snugly and securely in parallel relationship within the same channeled member.

An additional feature of the clip of my invention is that it does not protrude above the channel flanges so that the channel member can be covered if desired without interference from the clip.

Other and further objects, features and advantages of my invention will become apparent as the description proceeds.

Briefly, in accordance with a preferred form of my invention, there is provided a unitary self-locking retainer clip having a generally rigid non-flexing main body portion with locking tongues projecting from its opposite ends. Pressed-out portions from both the central and end portions form a pair of tongues located at opposite ends of the clip. The tongues are sheared along three sides from the main body material and a portion of the latter is bent at right angles to the main body to provide guide means cooperating with the channel flanges to position the retaining clip properly in the channel preliminary to pressing the clip to a desired installed or set position.

In use, the tubing or like devices are located within a member having an internal channel configuration and the clip is placed so that its ends extend downwardly in juxtaposition with the side walls of the channel. A force is then applied to the central portion of the clip so that the sharp ends of its tongues engage and bite into the side walls of the channel and the under surface of the central portion is brought into contact with the tubing or like devices to hold them within the channel. The clip is tightly secured in the channel since the distances between the remotely spaced end edges of the tongues is slightly greater than the interior width of the channel causing the tongues to be deflected outwardly from the plane of the central portion with one end corner edge of each tongue biting into the channel flange thereby strongly resisting any forces tending to remove the clip or tubing from the channel.

A more thorough understanding of my invention may be obtained by a study of the following detailed explanation taken in connection with the accompanying drawings, in which:

FIG. 1 is a view in perspective of a retainer clip securing a plurality of elongated devices in a channel in accordance with a preferred embodiment of my invention;

FIG. 2 is a view in perspective of a representative installation of channel member having elongated devices secured therein by clips constructed in accordance with my invention;

FIG. 3 is a view in perspective of the retainer clip of my invention prior to its insertion into a channel member;

FIGS. 4–10 illustrate further embodiments of clips formed in accordance with my invention;

FIGS. 11 and 12 illustrate other embodiments of my invention adapted for securing in side-by-side relationship elongated devices having different outside dimensions or configurations;

FIGS. 13 and 14 illustrate additional embodiments of my invention;

FIGS. 15a, b and c illustrate modifications of the tongue portion of clips illustrated in the previous figures; and, FIG. 16 illustrates an assembly for retaining multiple layers of tubing or like elongated devices within a common channel in accordance with my invention.

Referring now to FIG. 1, there is shown a generally U-shaped channel 10 having a web 11 interconnecting flanges 12, 13. Extended lengths of such channel of a wide range of widths $w$ and heights $h$ are widely used in industrial plants for supporting lengths of tubing 15 or other elongated devices such as wire, hose and small pipe.

As shown in FIG. 2, the channel member 10 is often oriented in a refinery, chemical plant, or other location, with the web 11 parallel to the vertical. As shown, a channel run may be provided with both a T connection 20 and an L connection 21 with the tubing 15 being bent as required to conform to the direction of the channel. As such, it will be apparent that some means is required for securing the tubing within the channel.

One typical embodiment of the invention clip 24, as shown in FIG. 3, has a main body comprising a central portion 25 and upstanding guide and positioning portions 26, 27. A pair of parallel slits 30, 31 are provided at one end of portion 25 and extend into the upstanding end portion 26 terminating at a transverse slit 32. A tongue 33 may thus be pressed out of the central and end portion and remain attached to the clip in the plane of the central portion 25. Each tongue extends from the central portion to beyond the planes of respective ones of the upstanding end portions 26, 27. The dimensions of the tongue members are such that the overall dimension across the tongues 33, 40 is slightly greater than the inside width of the channel with which the clip is to be utilized. Also, the overall dimension across the end portions 26, 27 is such that these can be inserted between the channel side flanges. Advantageously, a lip 35 is formed at the end of the tongue extending in the direction opposite to the upstanding end portion 26. In like manner, a tongue 40 having a lip 41 is formed at the opposite end of the retainer clip 24.

In use, the clip is pushed into the channel with the end portions 26, 27 extending inwardly in contact with the inner surfaces of flanges 12, 13. In the fully installed position, shown in FIG. 1, the main body portion 25 and end portions 26, 27 straddle the tubing inside the channel. Since the tongues 33, 40 extend beyond the end portions 26, 27 and extend across a distance slightly greater than the inside width of channel 10, they will be flexed out of the plane of the main body portion as the clip is pushed into the channel. As a result, the inner corner edges 35, 41 will be firmly wedged against the inner surfaces of flanges 12, 13. By virtue of the angle which the tongues assume in relation to the channel flanges, any forces tending to remove the tubing or the clip from the channel will be resisted by powerful forces locking both the clip and tubing in place. Depending on the material composition of the channel flanges, the inner transverse corner edges 35, 41 may slightly bite into flanges 12, 13.

As shown in FIG. 2, the clips 24 are used in spaced relationship along each channel 10 as required. A representative spacing is to employ a clip for every 2 ft. of channel. Since the clips do not protrude above the channel flanges, a cover 45 may be disposed over the channel 10 without any interference with the retainer clips.

For ease of assembling installations such as the one shown in FIG. 2, the clip may be dimensioned so that the end portions 26 fit snugly between the channel walls and are frictionally engaged thereby. Permanent installation of each clip within the channel member may then be delayed until a plurality of the clips have been temporarily and removably mounted to the channel over the tubular devices by inserting the clips only until the tongues abut the outer edges of the channel flanges. In this manner, changes may be easily made in the routing of the tubing or tubing runs may be added or removed until the final system that is desired has been accomplished, after which the clips are respectively pushed into the channel to effect a final assembly.

The clip 24 is advantageously formed from a blank sheet of resilient sheet material, such as steel, spring bronze, stainless steel or plastic and may be completely or partially plated, painted, galvanized, plastic or rubber coated, or left bare. A representative clip is formed from spring temper 18-8 stainless steel sheet or strip having a thickness of .020 inch.

Alternative embodiments of my invention are shown in FIGS. 4-10. Referring to FIGS. 4 and 5, the central portion 50 of the clip body may be formed with a longitudinal bead 51 for increasing the resistance to flexural stresses. This is particularly advantageous for providing clips for extra-wide channel members. A variant cross-section configuration is shown in FIG. 6 wherein the cross-section of the central portion is provided with a plurality of corrugations 52.

Embodiments are shown in FIGS. 7 through 12 for facilitating retaining different types of tubing and other longitudinal members within a channel member. Thus, referring to FIGS. 7 and 8, the main body portion is provided with longitudinal stiffening flanges 55, 56 extending in the same direction as the end portions 57, 58. In this configuration, flanges 55, 56 also serve to provide a firmer grip on certain types of tubing materials thereby preventing longitudinal movement of the tubing with respect to the channel. Normally, this configuration is used for tubes having an outer configuration which will not be damaged or deformed by engagement with the lower edges of the flanges 55, 56.

The embodiment of my invention shown in FIGS. 9 and 10 comprises a clip having a pair of longitudinal flanges 60, 61 projecting from the outer edges of the central portion in a direction opposite to that of the end portions 62, 63. This configuration is particularly suited for use with tubing and other members having a soft or resilient outer configuration as it avoids contacting the tubing materials with a sharp or squared-off edge. It will further be apparent that the flanges of both the configurations of FIGS. 7, 8 and FIGS. 9, 10 serve to strengthen the main body portion against flexural stresses.

The embodiment shown in FIGS. 11 and 12 comprises a clip having a plurality of tangs along its edges of the central portion separated by slits 65. Tangs 66 may be bent at respectively different angles to the central portion or may be cut at different lengths to secure tubing or other elongated devices of different outside dimension or configuration in side-by-side parallel relationship within the channel in a manner made clear by FIGURES 11 and 12.

There is shown in FIG. 13 a clip configuration formed by extending parallel slits 70, 71 entirely to the ends of the material, thereby forming a pair of guide feet 72, 73 for facilitating insertion of the retainer into the channel member.

Another configuration shown in FIG. 14 involves forming a pair of tongues 75, 76 at both ends of the main body portion and forming a guide foot 77 between the tongues 75, 76 for facilitating insertion of the retainer into the channel.

The tongue member in each of the several embodiments described herein above may be modified as shown in FIGS. 15a-c. Thus, the exterior edge of the tongue may be provided with a single or a plurality of serrations 80 as shown in FIG. 15a, or the exterior edge of the tongue may be provided with an arcuate perimeter 81 as shown in FIG. 15b. In FIG. 15c is shown still another configuration wherein the tongue is provided with a knife edge 82.

Another advantage possessed by clips constructed in accordance with my invention is illustrated in FIG. 16. As shown, a first layer of tubing 85 is secured by a first clip 86 and a second layer of tubing 87 is secured by a second clip 88, all within the confines of a single channel. Thus, depending upon the depth of the channel, plural layers of tubing may be retained therewithin, thereby substantially reducing the channel requirements for a system requiring a number of conduits along a given path.

It will thus be seen that my invention comprises a retainer clip which does not require any holes to be drilled in the channel or any nuts or bolts to be assembled during the assembly of the clip within the channel. Other advantages include that a given size of retainer clip may be used to secure a number of different sizes of tubing, the same clip may be used regardless of channel formed depth, and the same clip will hold one or several layers of tubing in a given channel. Furthermore, the clip is designed to hold practically any type of elongated devices within a channel, be it tubing, wire, hose, pipe or conduit. Furthermore, the clip does not protrude above the channel flanges so that the channel may be covered without any interference with the clip.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. A one-piece self-locking retainer clip adapted to be pressed between rigidly spaced facing side walls and to be locked against reverse withdrawal movement therefrom, said clip being formed from thin stiff resilient material and being generally U-shaped, the legs of said clip being spaced to contact said facing side walls when installed therebetween, the main body portion of said clip interconnecting said legs having locking tongues extending in opposite directions therefrom with their remote ends projecting beyond the exterior surfaces of said legs, at least portions of the remotely spaced transverse edges of said tongues being spaced apart by a distance slightly greater than the distance between the adjacent faces of said rigidly spaced side walls whereby said tongues are deflected outwardly as said clip is forced inwardly between said rigidly spaced side walls to lock the clip against withdrawal.

2. A retainer clip as defined in claim 1 characterized in that said legs extend oppositely to the direction of deflection of said tongue and serve to align said clip to lie accurately crosswise between and generally normal to said rigidly spaced side walls before being advanced toward the installed locked position thereof.

3. A retainer clip as defined in claim 2 characterized in that said legs have resilient frictional contact with said rigidly spaced side walls and are thereby effective to hold said clip firmly and temporarily in position between said side walls before said tongues are deflected into locking engagement therewith.

4. A retainer clip as defined in claim 2 characterized in that said legs lie in part to either lateral side of said tongues.

5. A retainer clip as defined in claim 2 characterized in that said legs have a length not greater than the diameter of the cylindrical member intended to be retained by said clip between said rigidly spaced side walls.

6. A retainer clip as defined in claim 1 characterized in that said legs are generally flat and generally parallel to one another.

7. A retainer clip as defined in claim 1 characterized in that said legs are positioned to have resilient frictional contact with said rigidly spaced side walls both before and after said tongues are deflected by advancement of said clip between said rigidly spaced side walls.

8. A retainer clip as defined in claim 1 characterized in that the main body portion of said U-shaped clip is straight and disposed generally at right angles to said legs.

9. A retainer clip as defined in claim 1 characterized in that the main body portion of said U-shaped clip is nonplanar transversely thereof to reinforce and strengthen the same against deflection during and after installation.

10. A retainer clip as defined in claim 9 characterized in that said main body portion includes at least one corrugation extending lengthwise thereof.

11. A retainer clip as defined in claim 10 characterized in that the main body portion of said clip is strengthened against bending by being of shallow U-shaped transversely thereof throughout a major portion of its length.

12. A clip as defined in claim 11 characterized in that the legs of said U-shaped main body portion extend in the same direction as the legs at the opposite ends of said clip.

13. A clip as defined in claim 12 characterized in that the legs along the opposite edges of said main body portion are slit to provide a plurality of separate tangs each individually bendable to lie at any desired angle relative to the general plane of the main body of said clip.

14. A clip as defined in claim 11 characterized in that the legs along the opposite sides of the main body of said clip extend therefrom in a direction opposite to the legs across the ends of said clip.

15. A one-piece self-locking retainer clip of said resilient strip material, said clip being of U-shape and having a pair of legs lying generally normal to the opposite ends of the bight portion thereof, said bight portion including a pair of tongues having their adjacent ends integral with said bight portion and having their remotely spaced transverse ends projecting slightly beyond the outer faces of said legs, and the transverse ends of said tongues having sharp corners spaced apart lengthwise of said bight portion by a distance slightly greater than the distance between the upright flanges of a channel member into which said clip is adapted to be pressed for locked retention therein.

16. A retainer clip as defined in claim 15 characterized in that said legs are sufficiently wide and stiff and effective to hold the main body of said clip generally parallel with the bottom web of the channel while the clip is being pressed to its installed position therein.

17. A retainer clip as defined in claim 16 characterized in that the transverse end edges of said tongues are parallel to one another and generally normal to the longitudinal axis of said bight portion.

18. A clip as defined in claim 17 characterized in that the lateral edges of said bight portion are bent away from said legs about a short radius to provide reinforcing ribs and a rounded edge along either side of said bight portion.

19. A clip as defined in claim 15 characterized in that the transverse ends of said tongues are serrated to provide a plurality of individual teeth each engageable with the flanges of said channel and cooperating to lock said clip assembled therebetween.

20. A clip as defined in claim 15 characterized in that said legs are insertable between the channel flanges ahead of said tongues and effective to position said clip accurately crosswise of said channel with the bight portion of the clip generally parallel to the web of the channel before said tongues engage the channel flanges.

References Cited

UNITED STATES PATENTS

| | | | |
|---|---|---|---|
| 2,419,675 | 4/1947 | Carpenter | 248—68 |
| 2,744,708 | 5/1956 | Bedford | 248—73 |
| 2,855,648 | 10/1958 | Jansson | 24—81 |

FOREIGN PATENTS

| | | |
|---|---|---|
| 1,219,637 | 5/1960 | France. |
| 1,334,994 | 12/1963 | France. |
| 1,380,827 | 12/1964 | France. |
| 1,028,026 | 8/1963 | Great Britain. |
| 617,895 | 2/1961 | Italy. |

CHANCELLOR E. HARRIS, *Primary Examiner.*

CLAUDE A. LE ROY, *Examiner.*

J. F. FOSS, *Assistant Examiner.*